P. W. PAYNE.
TEST INDICATOR.
APPLICATION FILED AUG. 25, 1916.
1,241,469.
Patented Sept. 25, 1917.
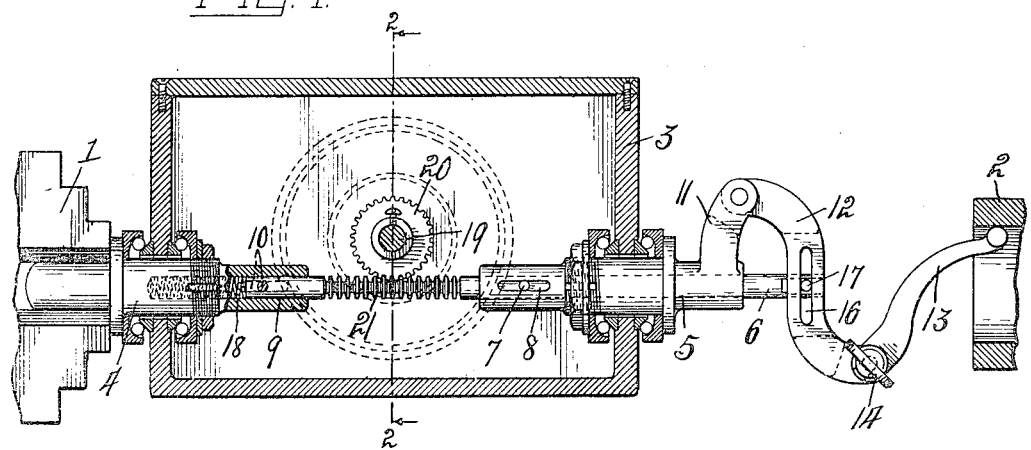
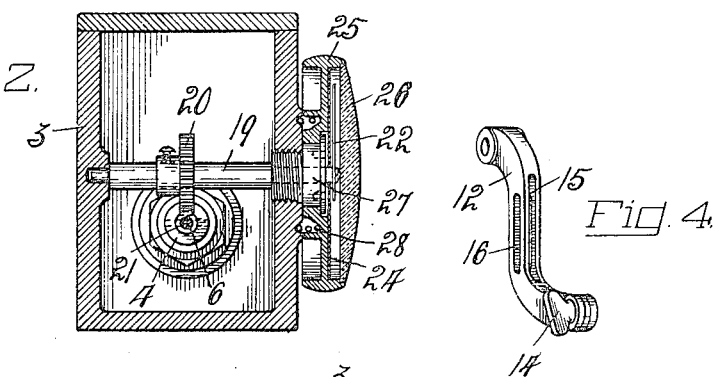
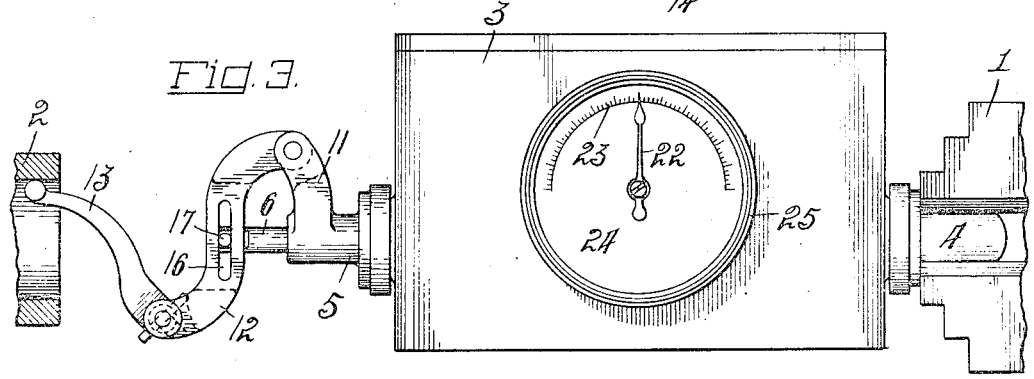
INVENTOR
Parl W. Payne,
By Owen, Owen & Crampton,
His attys.

UNITED STATES PATENT OFFICE.

PARL W. PAYNE, OF TOLEDO, OHIO, ASSIGNOR OF ONE-HALF TO ROLIN E. KILPATRICK, OF TOLEDO, OHIO.

TEST-INDICATOR.

1,241,469.　　　　　　　Specification of Letters Patent.　　Patented Sept. 25, 1917.

Application filed August 25, 1916. Serial No. 116,822.

*To all whom it may concern:*

Be it known that I, PARL W. PAYNE, a citizen of the United States, and a resident of Toledo, in the county of Lucas and State of Ohio, have invented a certain new and useful Test-Indicator; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to test indicators, and particularly to those of the class used in connection with a rotatable tool holder and operable to determine the trueness of different surfaces of work-pieces.

The object of my invention is the provision of a device of this character which is simple and inexpensive in its construction, capable of being easily and quickly applied to a drill-spindle, lathe-chuck, or the like, and is accurate and efficient in determining the trueness of work surfaces.

The invention is fully described in the following specification, and while, in its broader aspect it is capable of embodiment in numerous forms, a preferred embodiment thereof is illustrated in the accompanying drawings, in which—

Figure 1 is a sectional elevation of a device embodying my invention in operative relation to a lathe-chuck and work-piece. Fig. 2 is a section on the line 2—2 in Fig. 1. Fig. 3 is a side elevation of the device similar to Fig. 1, with the dial shown in full, and Fig. 4 is a perspective view of the lever arm of the device.

Referring to the drawings, 1 designates a lathe-chuck or other suitable tool or workholding device of a rotatable nature, and 2 a work-piece mounted in any suitable manner in axially spaced relation to said chuck, as is well understood in the art.

The test indicator embodying my invention comprises a box or casing 3, from one end of which projects a suitable shaft 4 for fitting at its outer end into and being clamped by the lathe-chuck 1, and from the other end of which projects a hollow stub shaft 5. The shafts 4 and 5 are mounted in axially spaced relation and have suitable ball or anti-friction bearings in the case ends to enable them to freely rotate with respect to the case. A rod or bar 6 projects axially through the shaft 5 and is caused to turn therewith and at the same time permitted to have longitudinal reciprocatory movements thereto by reason of a pin 7 projecting from said rod into a longitudinally disposed slot 8 in a side of the shaft 5 at the inner end portion thereof. The inner end of the rod 6 projects across the space between the two shafts 4, 5 and enters a registering axial socket 9 in the inner end of the shaft 4. The shaft 4 and the rod 6 have pin and slot connection 10 to cause the rod to be rotatably driven by said shaft and to be permitted at the same time to have free axial movements relative thereto.

An arm 11 projects transversely from the outer end portion of the shaft 5, and fulcrumed to the outer end of this arm and extending therefrom diametrically of the shaft is a lever 12 which, in the present instance, is shown as being of substantially S form. In other words, the lever 12 has a central portion which extends diametrically of the shaft axis and has one end turned inward therefrom toward the case 3 and fulcrumed to the outer end of the arm 11 while the other end thereof extends outward in opposition to the direction of extension of the inner end of the arm and is adapted to carry a tool coacting finger 13, said finger being pivoted to the lever 12 and clamped in adjusted position with respect thereto by a screw 14. The central, diametrically extending portion of the lever 12 is provided with a longitudinal slot 15 in register with the rod 6, and into which the outer end of said rod is intended to loosely project, and is also provided with a longitudinally extending slot 16, which intersects the slot 15 at right angles thereto and is adapted to loosely receive the respective ends of a pin 17 projecting transversely from the outer end of the rod 6. It is thus evident that any rocking movement of the lever 12 with respect to its carrying arm 11 will cause a corresponding reciprocatory movement to be communicated to the rod 6. It is also apparent that when the shaft 4 is rotatably driven by the chuck or engaging member 1, the shaft 5, rod 6, arm 11, lever 12 and work-coacting finger 13, will rotate in unison therewith.

The finger 13, in the present instance, is shown as coacting with the interior surface of a cylindrical work-piece, the axis of which is in register with the axis of the shafts 4 and 5, thereby causing any deviation of the interior surface of the work-piece from a true circle with said axis as its center to communicate a rocking movement to the finger 13 and lever 12 corresponding in degree to the extent of such deviation, and said lever in turn communicating a corresponding reciprocatory movement to the rod 6. It will be understood that the finger 13 may also be placed against the face of a work-piece or against the outer cylindrical surface thereof to determine the trueness of the respective surfaces. It is also evident that fingers 13 of different lengths and design may be employed in connection with the lever 12 to suit work-pieces of different forms and arrangement with respect to the tool.

A coiled compression spring 18 is mounted in the inner end of the socket 9 provided in the shaft 4, and acts against the adjacent end of the rod 6 to normally retain said rod, lever 12 and finger 13 in outwardly extended position, the inward movements of said members being against the tension of said spring.

The case 3, which may be of any suitable construction, has a shaft 19 journaled therein transversely of the rod 6 and at one side of the portion thereof which is disposed between the shafts 4 and 5, and carries a pinion 20 in mesh with a set of rack teeth 21 provided on the adjacent exposed portion of the rod 6 lengthwise thereof. The teeth of this rack are of annular form, extending completely around the rod 6, so that they remain in mesh with the pinion during a rotating of the rod or bar 6. It is evident that any longitudinal movement of the rack bar will communicate a corresponding rotary movement to the shaft 19 through the pinion 20. One end of the shaft 19 projects without a side of the case 3 and carries an indicator finger or pointer 22 in register with a scale 23 on a dial face 24. The dial face 24 is carried by a holding member 25 and is viewed through a glass face or lens 26 on said member.

To facilitate the use of my indicator the dial carrying member 25 is rotatably adjustable with respect to the case 3 and shaft 19, so that the dial may be turned to place the zero mark thereon in register with the indicator finger 22. It is thus evident that the indicator is quickly adjustable to suit the position of the work with respect thereto rather than the work being adjusted to suit the indicator. Upon a turning of the work-coacting finger 13 in engagement with the work the movement of the indicator finger 22 to one side or the other of the zero point will indicate the extent of irregularity of the work surface. The dial carrying member 25, in the present instance, is shown as being rotatably held to the side of the case 3 by a flanged bushing part 27, which threads into the case side and forms one bearing for the shaft 19, and a coiled compression spring 28 is mounted between the case 23 and member 25 in a recess provided in the latter and serves to yieldingly retain the member 25 in adjusted postion, as is apparent.

While I have illustrated my indicator more particularly in connection with a lathe-chuck, it is evident that it may be used in connection with a drill-spindle or other rotatable article or tool-holding member, and that the arrangement, form and construction of the device may be changed without departing from the spirit of the invention, as defined in the claims.

Having thus described my invention, what I claim as new, and desire to secure by Letters Patent, is,—

1. In a device of the class described, a rotatable and axially movable rack bar, indicator means having a pinion in mesh with said rack bar, and work-coacting lever means connected to said rack bar for rotation therewith and movable to impart reciprocatory movements thereto.

2. In a device of the class described, a reciprocally movable rack bar, indicator means having a pinion in mesh with said rack bar, and work-coacting lever means having connection with said rack bar and operable when rocked to impart axial movements to said bar, said lever means mounted for turning movements in a plane at right angles to the rocking movement thereof.

3. In a device of the class described, a rotatable shaft, work-engaging means movably carried by said shaft for rotation therewith and movable with respect to the shaft by irregularities in a work surface with which it has contact, and indicator means having rack and pinion connection with said work-engaging means and movable by movements of said means relative to the shaft.

4. In a device of the class described, a rotatable shaft, a work-coacting means fulcrumed to said shaft at one side of its axis for turning movements therewith and rocking movements relative thereto, a reciprocally movable rack bar connected to and movable by rocking movements of said work-coacting means, and indicator means having a pinion in connection with said rack bar and operable by movements of said bar.

5. In a device of the class described, a rotatable shaft, work-coacting means fulcrumed to said shaft at one side of its axis for turning movements therewith and rocking movements lengthwise thereof, a reciprocally movable rack bar having connection with said work-coacting means and movable by rocking movements thereof, a scale, an indicator finger in connection with said scale, a shaft carrying said finger, and a pinion carried by said shaft and in mesh with the teeth on said rack bar.

6. In a device of the class described, a rotatable shaft, a lever fulcrumed to said shaft at one side of its axis and extending across such axis for turning movements with the shaft and rocking movements lengthwise thereof, a work-coacting finger adjustably carried by said lever, a rack bar connected to and reciprocally movable by rocking movements of said lever, and indicator means having pinion connection with said rack bar.

7. In a device of the class described, a rotatable shaft, work-coacting means fulcrumed to said shaft at one side of its axis and extending across said axis, said means adapted to turn with said shaft and to have rocking movements axially thereof, a rack bar extending through said shaft coaxially thereof and connected to and reciprocally movable by rocking movements of said work-coacting means, and indicator means having pinion connection with said rack bar.

8. In a device of the class described, a case, a shaft rotatably carried by said case and adapted to have connection with a driving part, a rack bar projecting axially through said shaft for reciprocatory movements relative thereto, work-coacting means carried by said shaft for turning movements therewith and work-actuating movements lengthwise thereof, said means having connection with said rack bar and adapted to communicate work-actuating movements to said bar, and indicator means carried by said case and having a pinion in connection with said bar.

9. In a device of the class described, a case, a shaft rotatably carried by said case and adapted to be connected to a driving part, work-coacting means carried by said shaft for turning movements therewith and work-actuated movements lengthwise thereof, a second shaft carried by said case, an indicator finger carried by said second shaft, connection between said second shaft and work-coacting means for communicating work actuated movements of said means to said indicator finger, and scale carrying means carried by said case for rotary movements with respect to said second shaft and indicator finger.

In testimony whereof, I have hereunto signed my name to this specification.

PARL W. PAYNE.